(12) United States Patent
Wang

(10) Patent No.: US 7,092,249 B2  
(45) Date of Patent: Aug. 15, 2006

(54) COMPUTER ENCLOSURE INCORPORATING PIVOTABLE DRIVE BRACKET

(75) Inventor: Liang Chin Wang, Tu-chen (TW)

(73) Assignees: Hong Fu Jin Precision IND (Shenzhen) Co., Ltd., Shenzhen (CN); Hon Hai Precision Ind. Co., Ltd., Tu-Cheng (TW)

(*) Notice: Subject to any disclaimer, the term of this patent is extended or adjusted under 35 U.S.C. 154(b) by 0 days.

(21) Appl. No.: 10/946,775

(22) Filed: Sep. 21, 2004

(65) Prior Publication Data

US 2005/0105266 A1     May 19, 2005

(30) Foreign Application Priority Data

Nov. 18, 2003    (TW) .............................. 92220362 U

(51) Int. Cl.  
*G06F 1/16* (2006.01)
(52) U.S. Cl. ................... 361/685; 312/257.1; 174/138; 248/73
(58) Field of Classification Search ........ 361/679–687, 361/724–727; 312/223.1–223.6, 265.5, 257.1; 174/138, 138 D; 248/65, 71, 73  
See application file for complete search history.

(56) References Cited

U.S. PATENT DOCUMENTS

| 5,680,293 A | 10/1997 | McAnally et al. |
| 6,870,731 B1* | 3/2005 | Lin et al. ..................... 361/683 |
| 2004/0190266 A1* | 9/2004 | Chung ......................... 361/724 |
| 2005/0135051 A1* | 6/2005 | Chen et al. ................. 361/683 |

\* cited by examiner

*Primary Examiner*—Hung Van Duong  
(74) *Attorney, Agent, or Firm*—Wei Te Chung

(57) ABSTRACT

A computer enclousare includes a chassis (10) and a drive bracket (20). The chassis has a pair of side plates (14a, 14b). Each side plate has a pivot (144). A pair of washers (54) is respectively attached to the side plates of the chassis. Each washer has an arcuate guiding slot (547) concentric with the pivot. The guiding slot has indented edges with a series of retaining recesses (549) defined. A pair of pivot arms (52, 62) is attached to the drive bracket for pivotably engaging with the pivot. Each pivot arm has a sliding rod (529) for sliding along the at least one indented edge of the guiding slot. When the drive bracket is rotated about the pivots of the chassis, the drive bracket can be retained at different angles with respect to the chassis with the sliding rods retained by the different retaining recesses.

20 Claims, 5 Drawing Sheets

COMPUTER ENCLOSURE INCORPORATING PIVOTABLE DRIVE BRACKET

BACKGROUND OF THE INVENTION

1. Field of the Invention

The present invention relates to a computer enclosure, and particularly to a computer enclosure incorporating a drive bracket.

2. Description of the Related Art

The trend toward miniaturization in the computer industry requires fully exploiting the internal space of a computer. This requires components in the computer to be compactly arranged in a confined space inside the computer enclosure. Typically, components such as data storage devices are attached to the computer enclosure with screws. During attachment, each component must be supported by hand. This process is complicated and time-consuming. Furthermore, this type of mounting technique dose not usually allow for installation or replacement of serviceable components located below the data storage device. Thus new technique are being developed in an endeavor to simplify the installation process.

U.S. Pat. No. 6,388,876 B1 discloses a drive bracket pivotably attached to a computer enclosure. The computer enclosure includes a housing and a drive bracket. The housing has a pair of opposite side panels. Each side panel defines a guiding slot and a retaining recess. The drive bracket has a base from which a pair of side walls extends. Each side wall has an external guiding pivot rotatably received in a corresponding guiding slot, to allow the drive bracket to rotate with respect to the housing between a first position and a second position. In the first position, ample access to an interior space of the housing is available. In the second position, the drive bracket is fully and securely installed within the housing. However, the drive bracket can be retained only at the first and second positions.

Therefore, there is a need for a computer enclosure with a pivotable drive bracket which can be retained at any position desired.

SUMMARY OF THE INVENTION

Accordingly, an object of the present invention is to provide a computer enclosure with a pivotable drive bracket which can be retained at any position desired.

It is a further object of the present invention to enable easy and convenient installation and removal of computer data storage device.

To achieve the above-mentioned objects, a computer enclousure in accordance with a preferred embodiment of the present invention includes a drive bracket and a chassis. The chassis has a base plate and a pair of side plates. Each side plate has a pivot. A pair of washers is respectively attached to the side plates of the chassis. Each washer has an arcuate guiding slot concentric with the pivot. The guiding slot has at least one indented edge with a series of retaining recesses defined. A pair of pivot arms is attached to the drive bracket for pivotably engaging with the pivot. Each pivot arm has a sliding rod for sliding along the at least one indented edge of the guiding slot. Thereby, when the drive bracket is rotated about the pivots of the chassis, the drive bracket can be retained at different angles with respect to the chassis with the sliding rods retained by the different retaining recesses.

Other objects, advantages and novel features of the present invention will be drawn from the following detailed description of the preferred embodiments of the present invention with the attached drawings, in which:

DETAILED DESCRIPTION OF THE INVENTION

Figure 1:
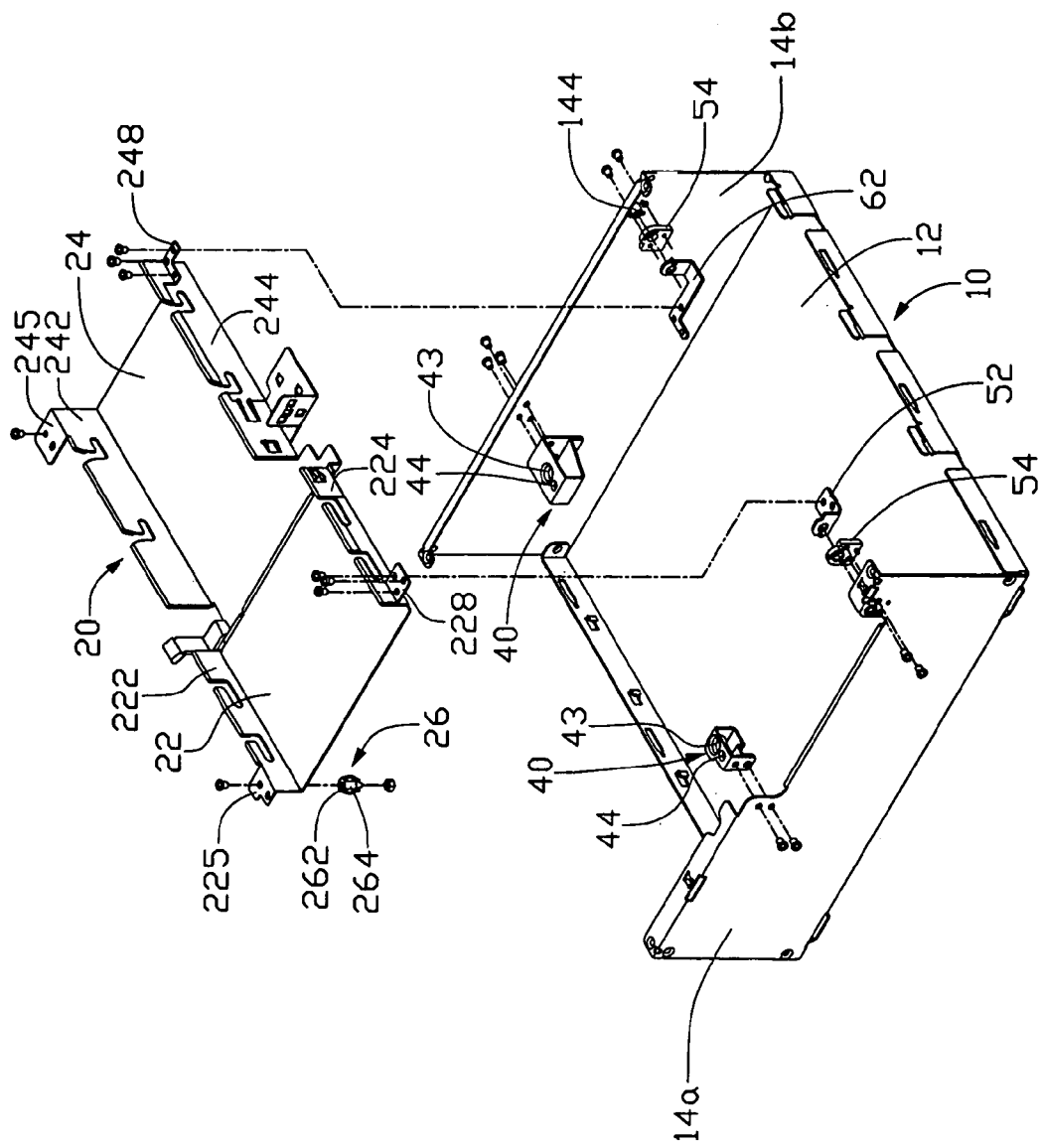
FIG. 1 is an exploded, isometric view of a computer enclosure in accordance with the preferred embodiment of the present invention, which comprises a drive bracket and a chassis.

Referring to FIG. 1, a computer enclosure in accordance with the preferred embodiment of the present invention comprises a chassis 10 and a drive bracket 20.

The drive bracket 20 has a first section and a second section. The first section has a base panel 22, a front panel 224 and a rear panel 222. The second section has a base panel 24, a front panel 244 and a rear panel 242. The front panels 224, 244 and the rear panels 222, 242 extend perpendicularly from opposite edges of the base panels 22, 24 respectively.

A pair of connecting tabs 228, 248 extend downwardly and then horizontally from top edges of the front panels 224, 244 respectively. A pair of pivot arms 52, 62 is attached to the connecting tabs 228, 248 with screws. The pivot arm 52 has a connecting portion 522 and a pivoting portion 524 (see FIG. 2). The pivot arm 62 has a connecting portion 622 and a pivoting portion 624 (see FIG. 3). The pivoting portions 524, 624 respectively have pivoting holes 528, 628 defined. Sliding rods 529, 629 are formed adjacent to the pivoting holes 528, 628.

Referring to FIG. 1, a pair of securing tabs 225, 245 extend horizontally from top edges of the rear panels 222, 242. A pair of claws 26 is secured to the securing tabs 225, 245 respectively with screws. Each claw 26 has a top 262 with a through hole defined for the screw secured therein. A plurality of curved resilient tabs 264 depend from the top 262.

Figure 2:
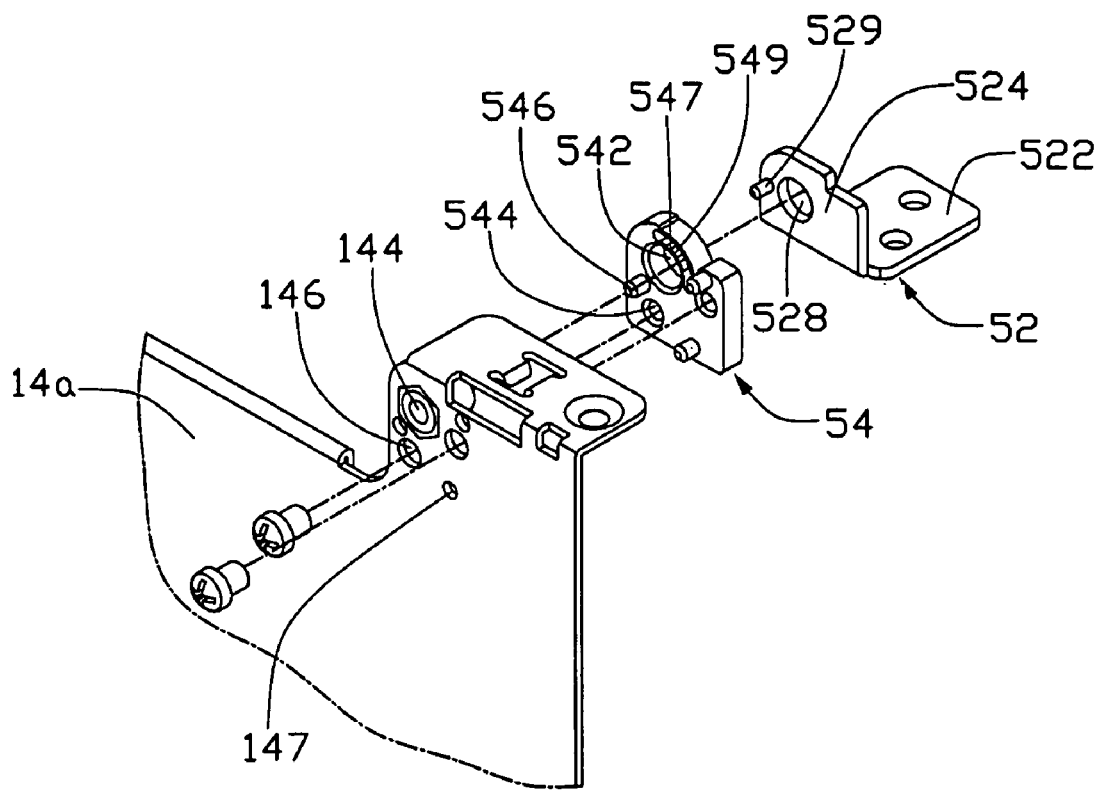
FIG. 2 is a partial view of the chassis of the present invention.
Figure 3:
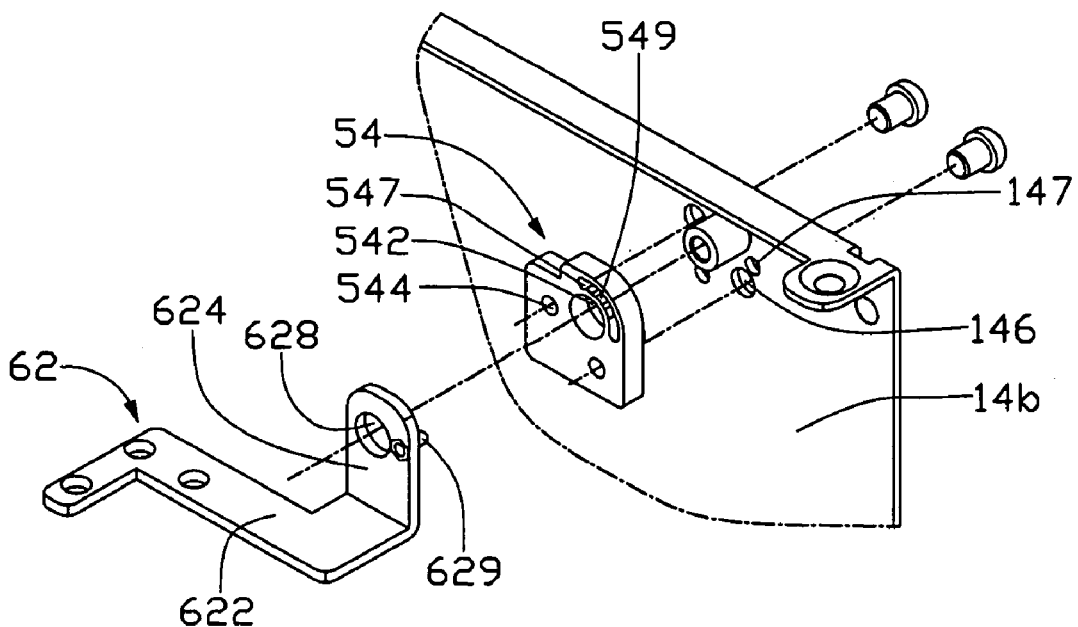
FIG. 3 is another partial view of the chassis of the present invention.
Figure 4:
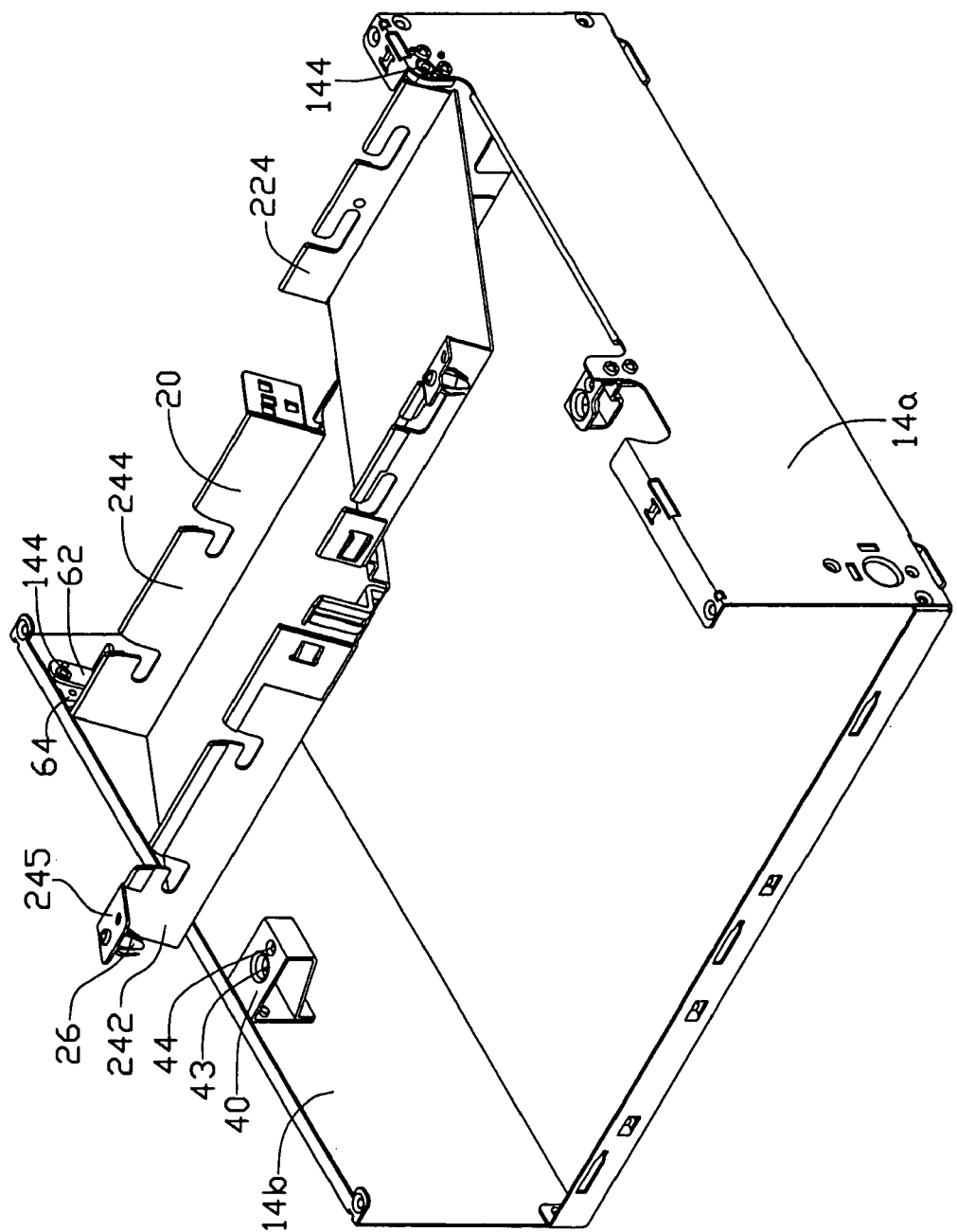
FIG. 4 is an isometric view of the present invention, showing the drive bracket at an angle with respect to the chassis.
Figure 5:
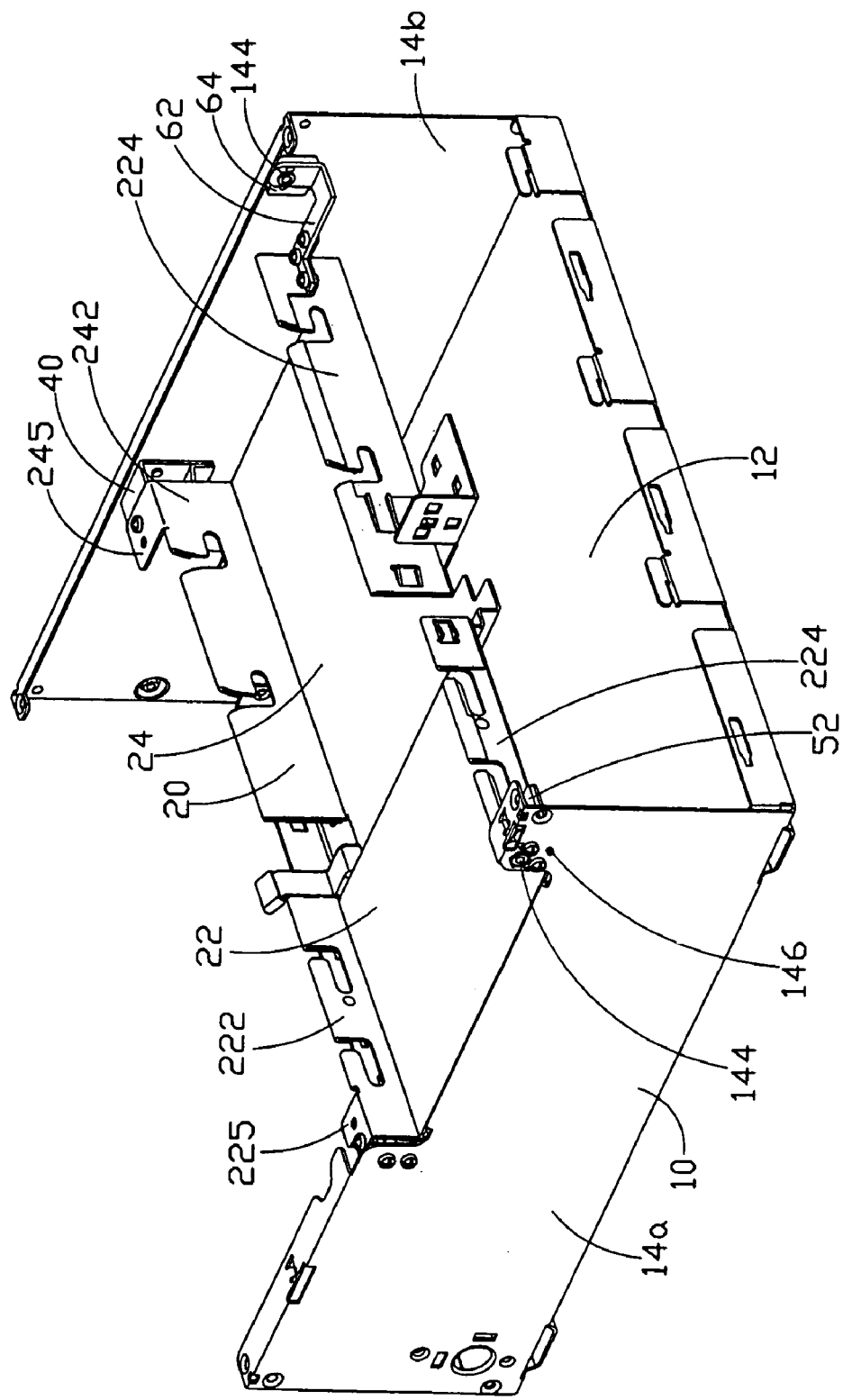
FIG. 5 is an assembled view of the drive bracket and the chassis.
Figure 6:
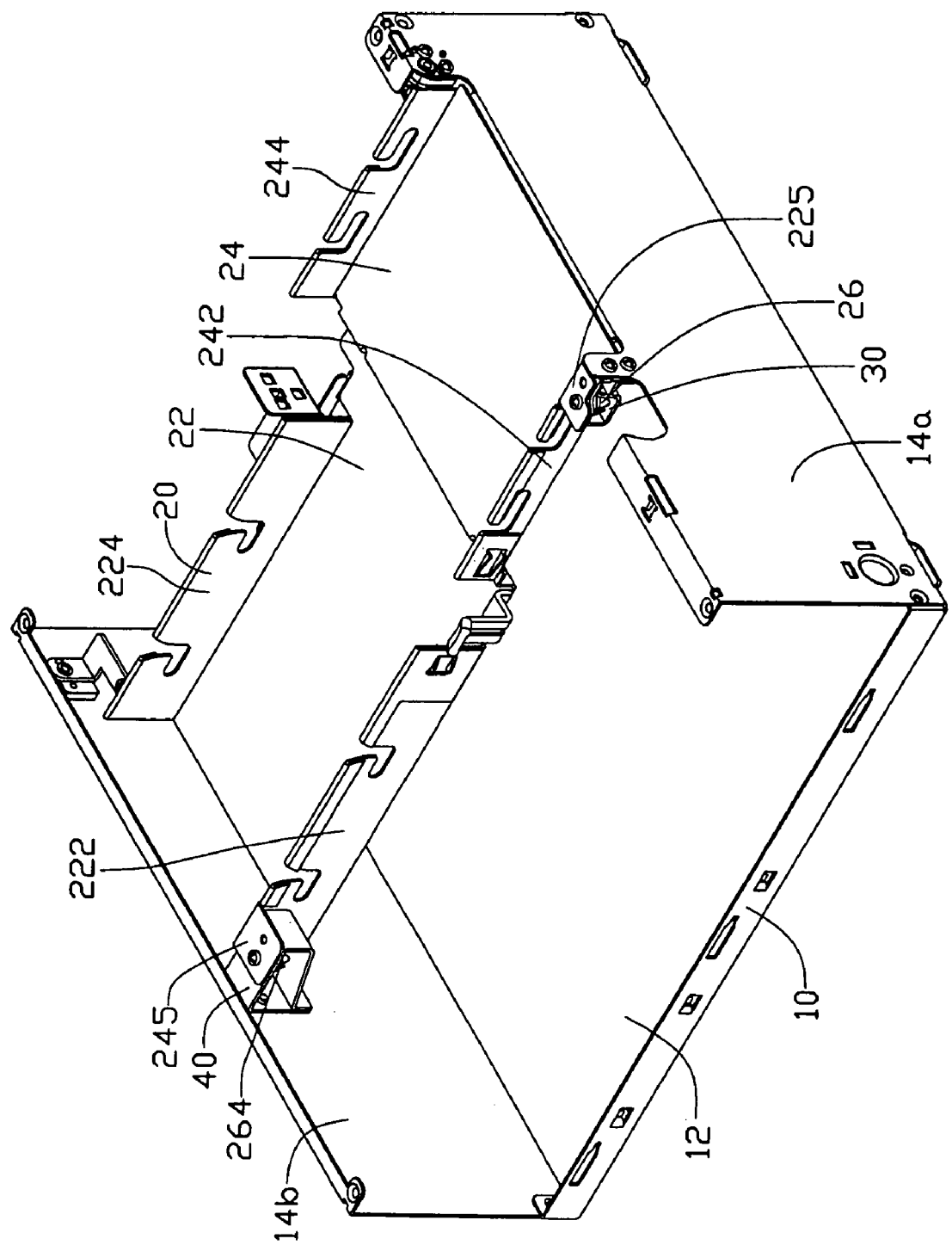
FIG. 6 is also an assembled view of the drive bracket and the chassis, but viewed from another aspect.

The chassis 10 has a base plate 12 and a pair of side plates 14a, 14b extending perpendicularly from opposite edges of the base plate 12. A pair of pivots 144 is formed inwardly on the side plates 14a, 14b respectively. Referring also to FIGS. 2 and 3, surrounding each pivot 144, two screw holes 146 and three locating holes 147 are defined on the side plate of the chassis 10.

A pair of washers 54 is attached to the side plates 14a, 14b respectively. Each washer 54 has a through hole 542 for the pivot 144 projecting through. An arcuate guiding slot 547 is defined adjacent to the through hole 542. The arcuate slot 547 is concentric with the through hole 542. The guiding slot 547 has indented edges, so that a series of retaining recesses 549 are defined therealong. A pair of threaded holes 544 is defined on each washer 54 corresponding to the the screw holes 146 on the side plates. Each washer 54 also has three locating posts 546 corresponding to the locating holes 147 on the side plate of the chassis.

A pair of racks 40 is respectively attached to the side plates 14a, 14b (Referring back to FIG. 1). Each rack 40 has a supporting surface with a receiving hole 43 and a screw hole 44 defined.

In assembly, the locating posts 546 of the washers 54 are inserted into the locating holes 147 of the side plates 14a, 14b, and the pivots 144 of the side plates 14a, 14b are inserted into the through holes 542 of the washers 54. The pair of washers 54 are secured to the side plates 14a, 14b by screws. Then, the sliding rods 529, 629 of the pivot arms 52, 62 are inserted into the guiding slots 547 of the washers 54, and the pivots 144 of the side plates 14a, 14b projects into the pivot holes 528, 628 of the pivot arms 52, 62. The connecting portions 522, 622 of the pivot arms 52, 62 are attached to the connecting tabs 228, 248 with screws.

Thereby, the drive bracket 20 can be rotated about the pivots 144, with the sliding rods 529, 629 of the pivot arms 52, 62 sliding along the guiding slots 547 of the washers 54. When the drive bracket 20 is rotated, the sliding rods 529, 629 can be accommodated in different retaining recesses 549 along the guiding slots 547. Therefore, the drive bracket 20 can be retained at different angles with respect to the base 10.

When the drive bracket 20 is rotated to a final position, the securing tabs 225, 245 abut the supporting surfaces of the racks 40. The claws 26 are compressed and inserted into the receiving holes 42. Then, the securing tabs 225, 245 are secured to the racks 30, 40 with screws. Therefore, the drive bracket 20 is secured to the base 10 firmly.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
a chassis having a base plate and a pair of side plates, each of the side plates having a pivot;
a pair of washers respectively attached to the side plates of the chassis, each of the washers having an arcuate guiding slot concentric with the pivot, the guiding slot having at least one indented edge with a series of retaining recesses defined; and
a drive bracket having a pair of pivot arms attached thereto, each of the pivot anus pivotably engaging with the pivots of the chassis, the pivot arm having a sliding rod for sliding along the at least one indented edge of the guiding slot;
whereby the drive bracket can be rotated about the pivots of the chassis, the drive bracket can be retained at different angles with respect to the chassis with the sliding rods retained by the different retaining recesses.

2. The computer enclosure as claimed in claim 1, wherein the chassis has at least one rack on the side plate thereof for supporting the drive bracket.

3. The computer enclosure as claimed in claim 1, wherein a through bole is defined on the washer for the pivot of the side plate extending through.

4. The computer enclosure as claimed in claim 1, wherein a pivoting hole is defined on the pivot arm for engaging with the pivot of the side plate.

5. The computer enclosure as claimed in claim 1, wherein each side plate of the chassis has at least one locating hole, and each washer correspondingly has at least one locating post for inserting thereinto.

6. The computer enclosure as claimed in claim 1, wherein the drive bracket has a pair of connecting tabs connected to the pivot arms.

7. The computer enclosure as claimed in claim 2, wherein the drive bracket has at least one securing tab for being secured to the rack.

8. The computer enclosure as claimed in claim 2, wherein the rack has a receiving hole defined, and the drive bracket has a claw for inserting into the receiving hole.

9. A computer enclosure comprising:
a chassis having a base plate and a pair of side plates;
a drive bracket one end of the drive bracket being pivotably attached to the chassis;
at least one rack attached to the chassis for supporting the other end of the drive bracket; and
retaining devices respectively formed on the chassis and the drive bracket to have the drive bracket retainably located at different angles with respect to the chassis.

10. The computer enclosure as claimed in claim 9, wherein a pair of pivots are respectively formed on the side plates of the chassis for the drive bracket rotated about.

11. The computer enclosure as claimed in claim 9, wherein the retaining devices comprise a guiding slot having a series of retaining recess defined along one edge, and a sliding rod adapted to be retained by different retaining recesses.

12. The computer enclosure as claimed in claim 9, wherein the drive bracket has at least one claw, and the rack defines at least one receiving hole for receiving said claw.

13. The computer enclosure as claimed in claim 11, wherein the guiding slot is defined at a washer, and the washer is attached to one of the side plates of the chassis.

14. The computer enclosure as claimed in claim 11, wherein the guiding slot is defined on one of the side plates of the chassis.

15. The computer enclosure as claimed in claim 11, wherein the sliding rod is formed on the drive bracket.

16. The computer enclosure as claimed in claim 15, wherein the sliding rod is formed on a pivot arm, and the pivot arm is secured to the drive bracket.

17. A drive bracket assembly of a computer chassis, comprising:
a drive bracket, comprising
a base panel;
a front panel and a rear panel extending from opposite sides of the base panel, a securing tab extending from the rear panel for being secured to the chassis, a pivot arm extending from the front panel for being pivotably attached to the chassis; and
retaining means having the drive bracket located at different angles with respect to the chassis.

18. The drive bracket assembly as claimed in claim 17, wherein the drive bracket has a washer adapted to be assembled to the chassis.

19. The drive bracket assembly as claimed in claim 18, wherein the retaining means comprises a guiding slot defined on the washer, and a sliding rod formed on the pivot arm.

20. The drive bracket assembly as claimed in claim 19, wherein the guiding slot has at least one indented edge with a series of retaining recesses defined, and the sliding rod is adapted to be retained by different retaining recesses.

* * * * *